United States Patent [19]
McLeod et al.

[11] Patent Number: 5,552,793
[45] Date of Patent: Sep. 3, 1996

[54] SELF CALIBRATED ACT PULSE COMPRESSION SYSTEM

[75] Inventors: Scott C. McLeod, Tucson, Ariz.; Avinoam S. Zerkowitz, West Hills, Calif.; Lillian G. Lent, Gilbert, Ariz.

[73] Assignee: Hughes Missile Systems Company, Los Angeles, Calif.

[21] Appl. No.: 348,417

[22] Filed: Dec. 2, 1994

[51] Int. Cl.$^6$ ....................... G01S 7/28
[52] U.S. Cl. ............................. 342/204
[58] Field of Search ..................... 342/174, 202, 342/204, 132

[56] References Cited

U.S. PATENT DOCUMENTS

| | | | |
|---|---|---|---|
| 3,618,095 | 11/1971 | Darlington | 342/201 |
| 4,117,409 | 9/1978 | O'Brien | 327/191 |
| 4,384,291 | 5/1983 | Lewis et al. | 342/196 |
| 4,404,562 | 9/1983 | Kretschmer, Jr. et al. | 342/194 |
| 4,833,479 | 5/1989 | Carlson | 342/194 |
| 4,926,185 | 5/1990 | Wittenberg | 342/201 |
| 4,983,979 | 1/1991 | McKenzie | 342/203 |
| 5,032,843 | 6/1991 | Zilliox | 342/202 |
| 5,036,328 | 7/1991 | Nakamura et al. | 342/204 |
| 5,278,567 | 1/1994 | Nourrcier | 342/202 |

*Primary Examiner*—Ian J. Lobo
*Attorney, Agent, or Firm*—Charles D. Brown; Wanda K. Denson-Low

[57] ABSTRACT

A self-calibrating pulse compression system which is able to optimally compress a chirped waveform notwithstanding variations in the chirped spectrum due to changes in transmitter characteristics or other factors. In a most general sense, the inventive pulse compression system includes a first circuit (12, 14) for providing a first waveform, a second circuit (16, 30, 32) for sampling the first waveform at predetermined time intervals to provide a plurality of calibration samples, a third circuit (30) for storing the calibration samples; and fourth circuit (16, 28, 30) for multiplying a second waveform by the stored calibration samples. In a specific implementation, the first circuit of the self-calibrating pulse compression system includes an impatt chirp transmitter (12). The output of the transmitter (12) is fed to an antenna (18) and to a first switch (22) by a circulator (20). The switch (22) is controlled by a timing circuit (16) which may be implemented with software in a host computer. The output signal of switch (22) is downconverted and input to a tapped delay line (28). In the best mode, the tapped delay line is implemented with an acoustic charge transport device (ACT). The ACT has a programmable multiplier on each tap. In a calibration mode, the output of the transmitter is input into the delay line and the taps are sampled to provide a plurality of calibration samples which are stored in random access memory. In operation, the calibration samples are used to program the tap multipliers. When the transmitted waveforms are received, the waveforms are stored in the tapped delay line and multiplied by the tap weights to provide a compressed pulse.

15 Claims, 5 Drawing Sheets

SELF CALIBRATED ACT PULSE COMPRESSION SYSTEM

BACKGROUND OF THE INVENTION

1. Field of the Invention

The present invention relates to radar systems. More specifically, the present invention relates to pulse compression systems for use in radar systems.

2. Description of the Related Art

A radar system transmits a pulse of electromagnetic energy and detects reflections of same from objects to effect object or target discrimination. The pulse is often chirped, quickly swept over a limited range of frequencies. When received by a matched filter having a dispersive delay line, the stretched or swept pulse is compressed providing most of the energy within a short time interval and thereby facilitating detection and correlation. As the frequency and phase of the transmitted pulse are critical, in general, the transmitted pulse must be coherent. That is, the transmitted pulse must be phase locked to a known reference. This is especially true for W band radar systems operating in the range of 94 gigahertz (Ghz). In this range, it has been difficult to generate a coherent chirped signal inexpensively.

Several approaches have been used to address this problem. For example, one approach involves injection locking. In accordance with this scheme, the transmitter is phase locked to a well-controlled waveform created at a low power level. This signal is tracked by the transmitter as it generates the output pulse. Unfortunately, this approach is quite costly due to the requirement of a very stable chirp signal which must be multiplied up to a higher frequency before amplification and transmission.

Another approach involves pulsing of an impatt diode with a direct current. In response to the current, the diode generates an output signal which may be used as a chirp signal. Unfortunately, the phase and frequency of the output signal is generally not known sufficiently to effect a subsequent compression of the received pulse.

With respect to the compression requirement, surface acoustic wave (SAW) dispersive delay lines have been considered and used in some applications. These devices have a predetermined transfer function such that when the received pulse is matched, it is compressed. If not, the resulting output is useless. Unfortunately, SAW devices are fixed and not adaptive. The transmitter must be tuned to the SAW device. However, transmitter characteristics vary from one unit to the next. Further, these characteristics are phoned to drift in response to contact or changes in operating temperature. Accordingly, matching transmitters to SAW devices has heretofore been exceedingly difficult.

Thus, there is a need in the art for an inexpensive, yet accurate technique for improving the performance of non-coherent pulse compression systems.

SUMMARY OF THE INVENTION

The need in the art is addressed by the present invention which provides a self-calibrating pulse compression system which is able to optimally compress a chirped waveform notwithstanding variations in the chirped spectrum due to changes in transmitter characteristics or other factors. In a most general sense, the inventive pulse compression system includes a first circuit for providing a first waveform, a second circuit for sampling the first waveform at predetermined time intervals to provide a plurality of calibration samples, a third circuit for storing the calibration samples; and fourth circuit for multiplying a second waveform by the stored calibration samples.

In a specific implementation, the first circuit of the self-calibrating pulse compression system includes an impatt chirp transmitter. The output of the transmitter is fed to an antenna and to a first switch by a circulator. The switch is controlled by a timing circuit which may be implemented with software in a host computer. This signal is downconverted and input to a tapped delay line. In the best mode, the tapped delay line is implemented with an acoustic charge transport device (ACT). The ACT has a programmable multiplier on each tap.

In a calibration mode, the output of the transmitter is input into the delay line and the taps are sampled to provide a plurality of calibration samples which are stored in random access memory.

In operation, the calibration samples are used to program the tap multipliers. When the transmitted waveforms are received, they are input into the tapped delay line and multiplied by the tap weights to provide a compressed pulse output.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
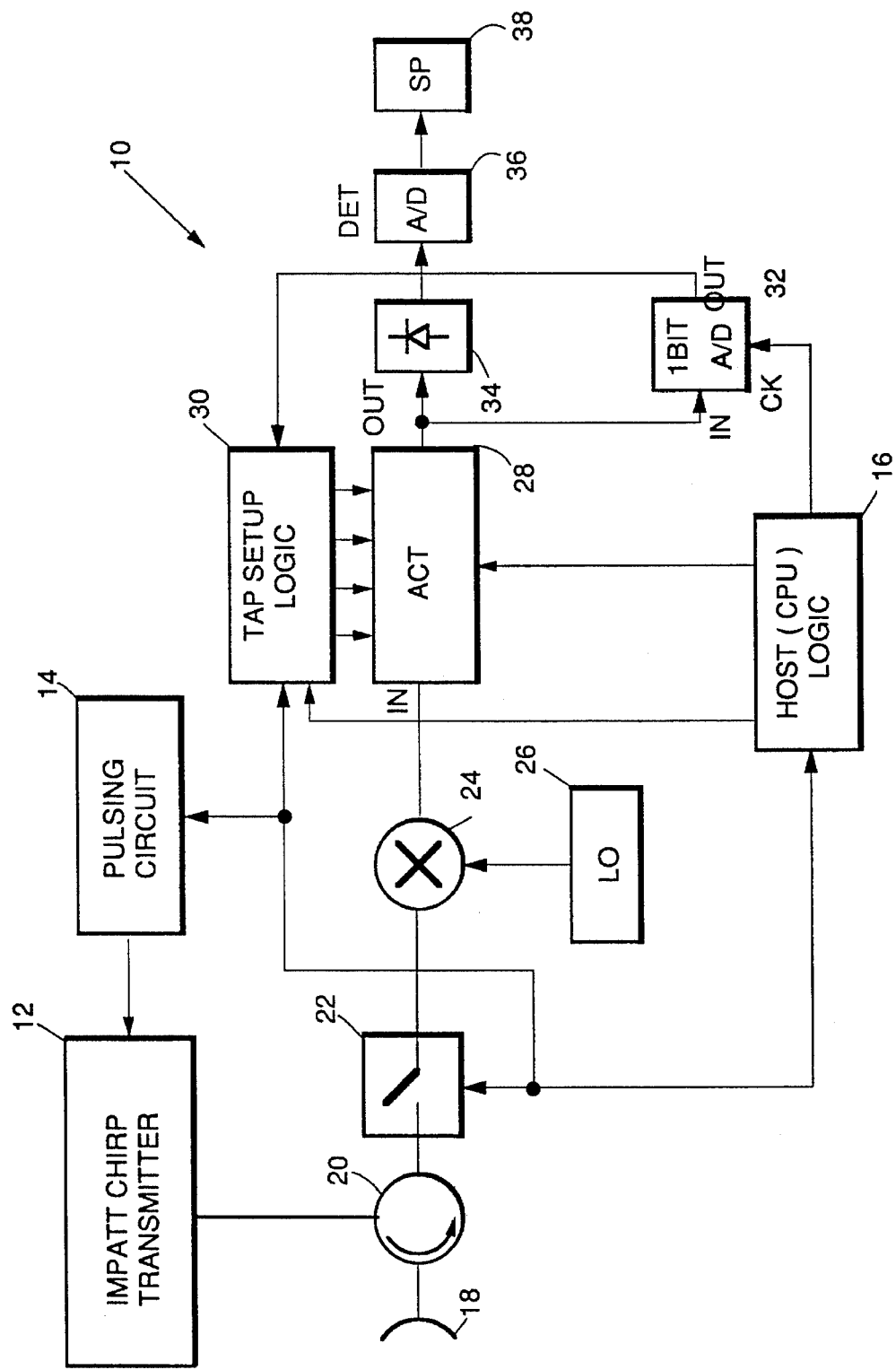
FIG. 1 is a simplified block diagram of a radar system incorporating the novel self-calibrating pulse compression system of the present invention.

FIG. 1 is a simplified block diagram of a radar system incorporating the novel self-calibrating pulse compression system of the present invention. The radar system 10 includes a conventional impatt diode which serves as a chirp transmitter 12. On receipt of a current pulse from a conventional pulsing circuit 14, the transmitter 12 generates a chirped waveform over a limited range of frequencies. The pulsing circuit 14 is triggered by timing logic 16, which, in the best mode, is implemented in software on a host central processing unit (CPU).

The output of the transmitter is fed to a conventional radar antenna 18 via a circulator 20. Pad of the transmit waveform is leaked from the circulator 22 to a blanking switch 22. The blanking switch may be a pin diode which can be turned off to attenuate any signal passing therethrough. The switch 22 operates under control of the timing logic 16. The mixer 24 uses a reference signal provided by a local oscillator to downconvert the leaked chirp waveform to a second waveform in the intermediate frequency range. The second waveform is input to a tapped delay line 28.

In the preferred embodiment, the tapped delay line 28 is implemented with an acoustic charge transport device (ACT) such as that currently sold by the Com Linear. This device has a plurality of taps at which a waveform may be sampled. Each tap has a programmable multiplier associated therewith. In accordance with the present teachings and as discussed more fully below, in a calibration mode, the samples of stored waveforms are used to provide tap weights by which the multipliers are programmed. Thereafter, the tap weights are used to optimally compress a signal received through the antenna 18. The tap weights are provided by tap setup logic 30 from waveform samples from the ACT 28 which are digitized by an analog-to-digital (A/D) converter 32. The ACT 28, tap setup logic 30 and A/D converter 32 operate under control of the timing logic 16 as illustrated in FIG. 1.

The output of the ACT 28 is input to a conventional detector 34. The output of the detector 34 is input to a second A/D converter 36. Hence, a detected digitized signal is provided to a conventional signal processor 38 for processing in a conventional manner.

Figure 2:
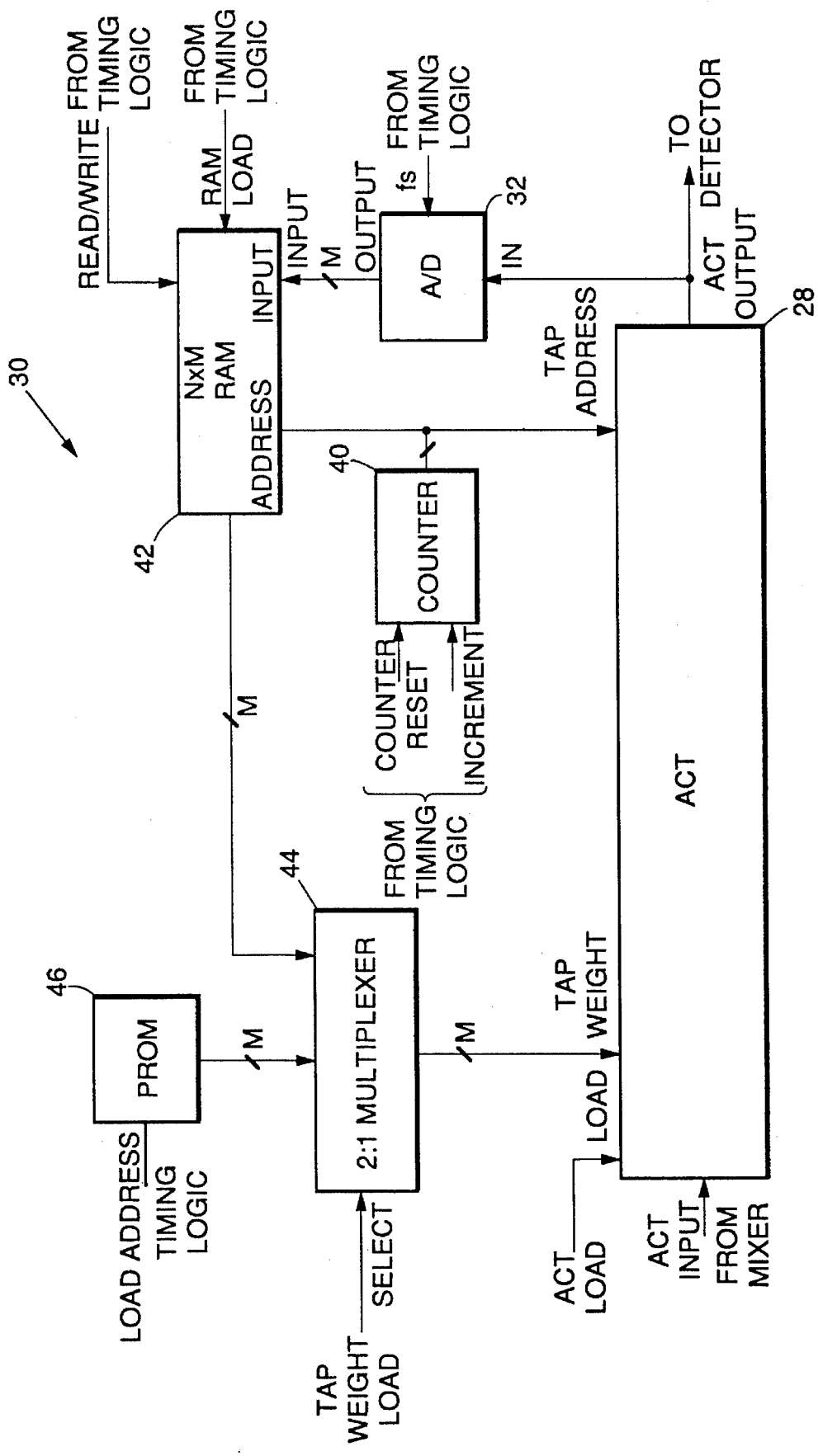
FIG. 2 is a simplified block diagram of an illustrative implementation of the tap setup logic, with the acoustic charge transport device, and the first analog-to-digital converter of the novel self-calibrating pulse compression system of the present invention.

FIG. 2 is a simplified block diagram of an illustrative implementation of the tap setup logic 30 with the acoustic charge transport device and the first analog-to-digital converter 32. The tap setup logic 30 includes a counter 40, an NxM random access memory (RAM) 42, a multiplexer 44 and a programmable read only memory (PROM) 46. Increment and reset signals are provided to the counter 40 by the timing logic circuit 16 (not shown). In a calibration mode, the counter provides a tap address to the ACT 28 as well as an address to the RAM 42. The output of the ACT 28 at the selected tap is digitized by the first A/D converter 32 and stored in the RAM 42 at the selected address under RAM read/write and load control of the timing logic 16. Next, the timing logic increments the counter to select another tap and the output of the ACT 28 for the selected tap is stored at a new address in the RAM 42. After all of the taps have been selected, the counter 40 is strobed by the timing logic 16 and the contents of the RAM 42 are read into the ACT programmable multipliers (not shown) by the multiplexer 44. The multiplexer 44 operates under control of the timing logic to selectively input N tap weights (An, where n=0 to N-1) to the ACT which are stored in the PROM 46 during calibration and in the RAM 42 during the operation mode.

Figure 3A:
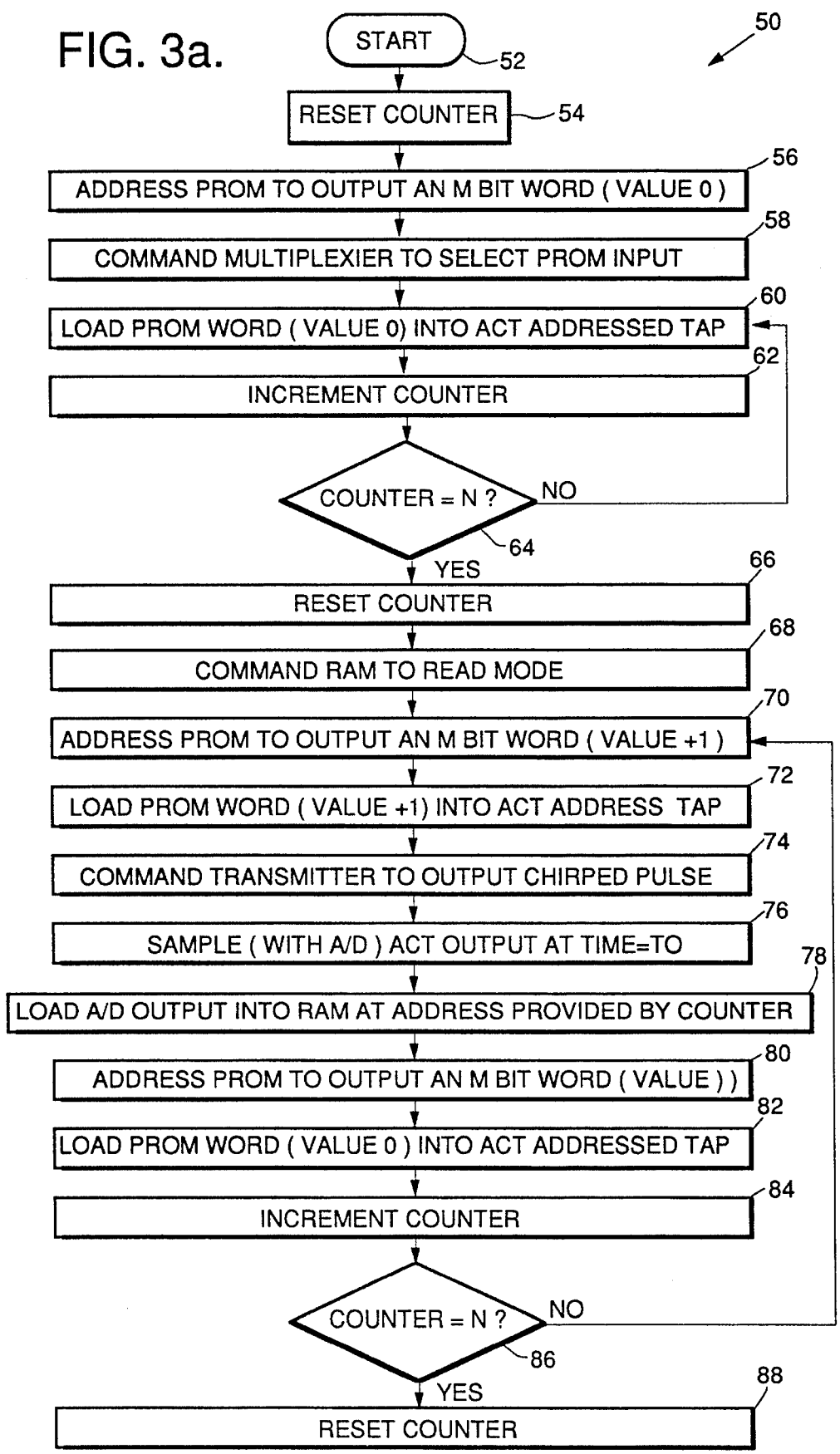
FIGS. 3A and 3B show a flow diagram of the operation of the ACT calibration routine executed by the timing logic of the novel self-calibrating pulse compression system of the present invention.
Figure 3B:
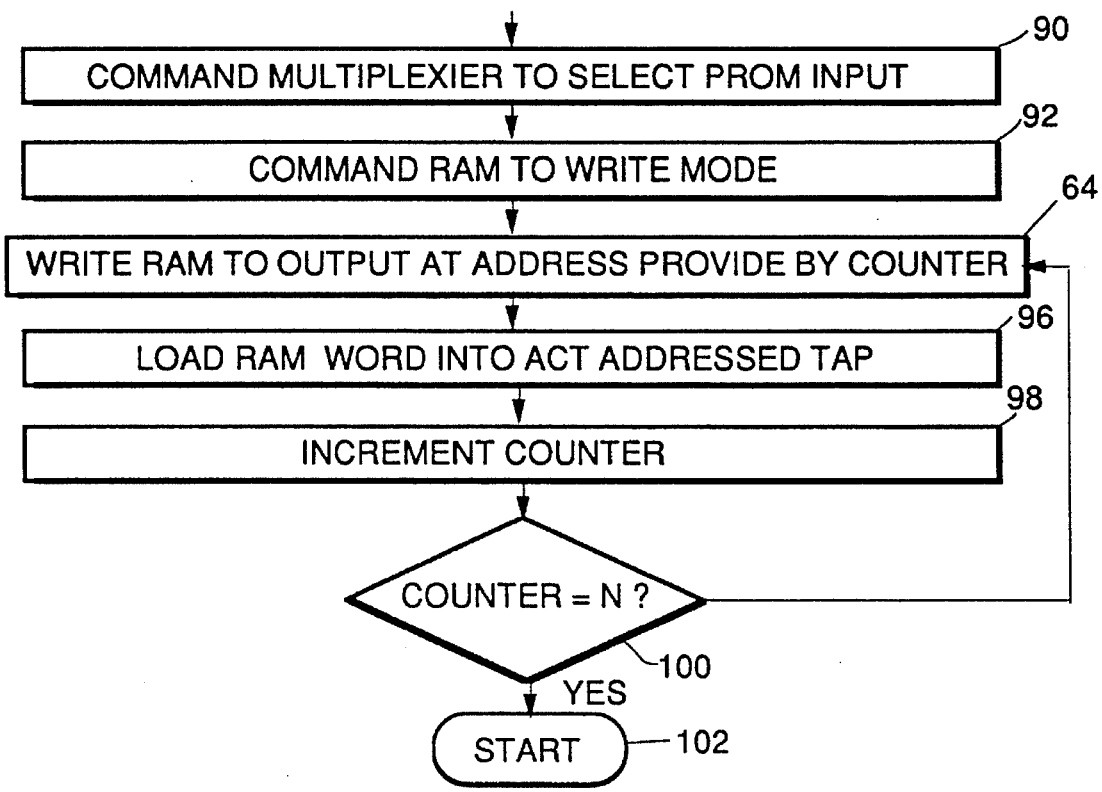

FIG. 3 is a flow diagram of the operation of the ACT calibration routine executed by the timing logic 16. The routine 50 is initiated at step 52 by the host computer (not shown). At this point, the tap weights (multipliers) of the ACT 28 are set to zero by the timing logic in the following manner. First, at step 56, the PROM 46 is addressed to output an M bit word (value 0). Next, at step 58, the multiplexer 44 is commanded to select PROM input. At step 60, the PROM word value is loaded into the ACT addressed tap. At steps 62-64, the counter 40 is incremented and the process is repeated until the PROM value (zero in the illustrative embodiment) is loaded into the ACT. At step 66, the counter is reset to zero. As mentioned above, the counter output is used as the tap address for the ACT 28 and the RAM 42. Hence, when the counter is set to zero, the ACT is set to load a tap multiplier for tap 0 and the RAM is set to load the A/D output at address 0. At step 68, the RAM is commanded into read mode. Next, a tap weight of +1 is loaded into the tap address location ($A_0$=+1 and $A_n$=0 for n=1 to N-1) in the following manner. First, at step 70, the PROM 46 is addressed to output an M bit word having a value of +1. At step 72, the PROM word of value +1 is loaded as a weight into the selected ACT address tap, tap 0. Next, the transmitter 12 (FIG. 1) is commanded to output a chirped pulse (step 74) of which a portion leaks into the mixer 24 and the ACT 28 as described above. At the optimum time, that is, when the chirped waveform fills the ACT delay line, the output is sampled by the A/D converter 32 in response to a sampling signal supplied by the timing logic 16. At step 78, the output of the A/D converter 32 is loaded into the RAM at the address supplied by the counter 40 in response to a RAM load command from the timing logic 16. This stored number is the tap weight for tap 0 which will be loaded into the ACT when all tap weights have been determined in a similar manner. The tap weight for tap 0 ($A_0$) is set back to zero so that all tap weights equal zero by the following commands from the timing logic. First, at step 80, the PROM is addressed to output an M bit word of value 0. At step 82, the stored PROM word (value 0) is loaded into the selected ACT address tap. At step 84, the counter is incremented and, at step 86, the process is repeated from step 70 but with the tap and RAM address at 1. This process is repeated for all taps (N times). When all taps have been determined, the tap weights in RAM are loaded into the ACT by the following commands from the timing logic. First, at step 88, the counter is reset. Next, at step 90, the multiplexer is commanded to select RAM input. At step 92, the RAM is put in write mode. Next, at step 94, the contents of RAM at the address set by the counter is output and, at step 96, this word is stored into the ACT tap addressed by the counter. At step 98 the counter is incremented and the process is repeated until all tap weights have been loaded. The ACT is now calibrated and will properly compress the waveform.

Figure 4:
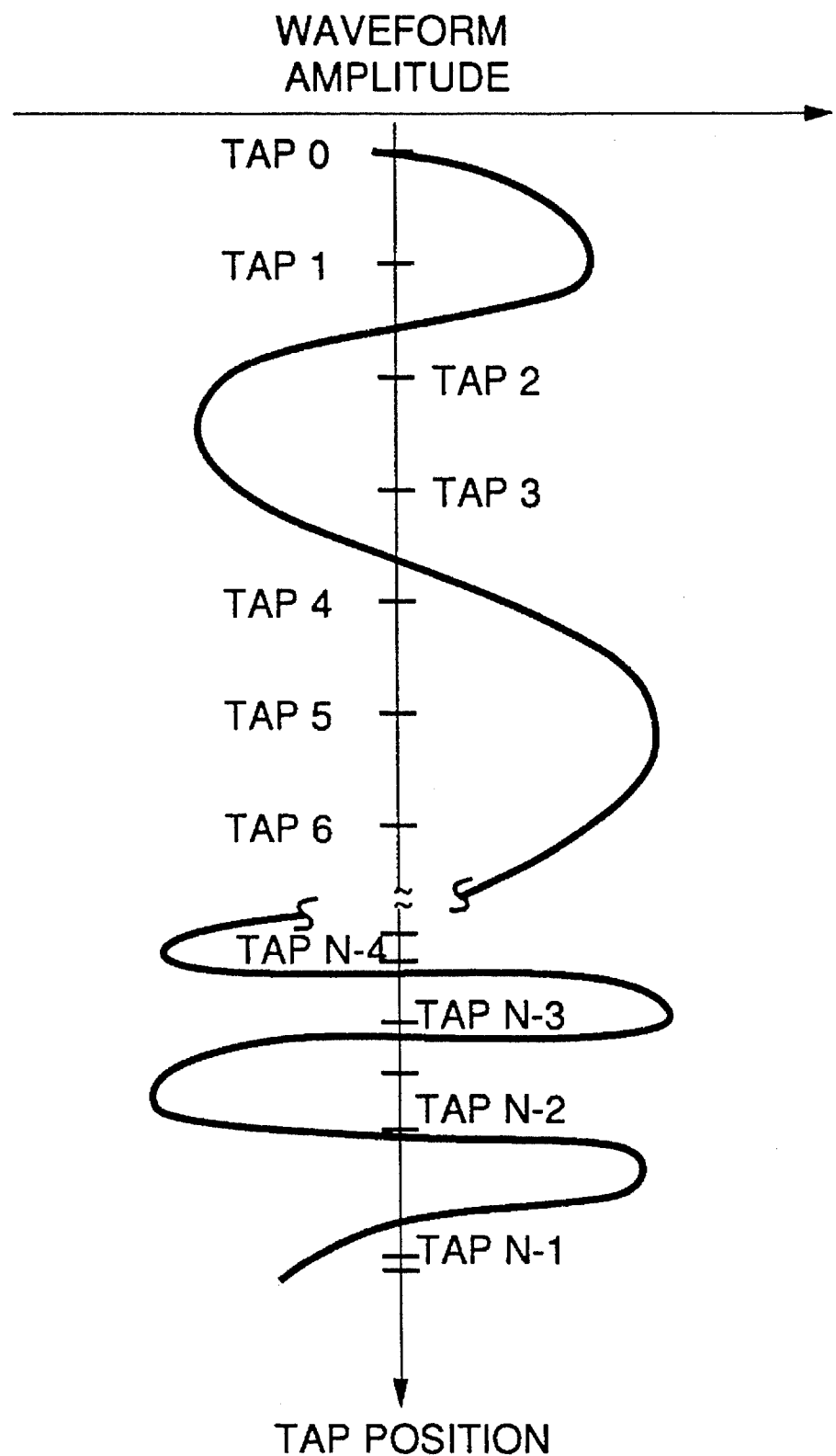
FIG. 4 shows a chirped transmit waveform in the ACT delay line at time $t_o$.

FIG. 4 shows a chirped transmit waveform in the ACT delay line at time $t_o$. The x axis show the tap position relative to the waveform. When tap 4 is +1 during the calibration routine, the ACT output amplitude is P. This amplitude is digitized by the A/D and loaded in RAM. This is the case for all taps when the taps are selected at the appropriate time in the calibration cycle.

Thus, a self-calibrating pulse compression system is disclosed which is able to optimally compress a chirped waveform notwithstanding variations in the chirped spectrum due to changes in transmitter characteristics or other factors.

The present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and Accordingly,

What is claimed is:

1. A self-calibrating pulse compression system comprising:

first means for providing a waveform;

second means including a tapped delay line for sampling the waveform at predetermined time intervals to provide a plurality of calibration samples;

third means for storing the calibration samples; and fourth means for multiplying the waveform by the stored calibration samples.

2. The invention of claim 1 wherein the first means includes a transmitter.

3. The invention of claim 2 wherein the transmitter is an impatt chirp transmitter.

4. The invention of claim 2 wherein the first means further includes a circulator connected to an output terminal of the transmitter.

5. The invention of claim 4 wherein the first means further includes a first switch connected to an output of the circulator.

6. The invention of claim 5 wherein the first means further includes a mixer connected to an output of the switch for downconverting the output thereof.

7. The invention of claim 6 wherein the second means includes a programmable multiplier on each tap of the delay line.

8. The invention of claim 7 wherein the third means includes tap setup logic means for programming the multipliers.

9. The invention of claim 8 wherein the tap setup logic means includes random access memory means for storing the calibration samples.

10. The invention of claim 9 wherein the fourth means includes means for programming the multipliers with the stored calibration samples.

11. The invention of claim 10 wherein the fourth means includes a second switch controlled by computer means for providing timing control signals.

12. The invention of claim 1 wherein the tapped delay line is an acoustic charge transpond device.

13. A radar system comprising:

first means for transmitting a waveform;

second means including a tapped delay line for sampling the waveform to provide a plurality of waveform samples; and third means for adaptively compressing the waveform in response to the waveform samples.

14. A method for adaptively processing electromagnetic signals including the steps of:

transmitting a waveform;

processing said waveform through a tapped delay line to provide a plurality of waveform samples; and adaptively compressing the waveform in response to the waveform samples.

15. A self-calibrating pulse compression method including the steps of:

providing a waveform;

processing said waveform through a tapped delay line to provide a plurality of calibration samples of said waveform at predetermined time intervals; and multiplying the waveform by the calibration samples.

* * * * *